US006680837B1

(12) United States Patent
Buxton

(10) Patent No.: US 6,680,837 B1
(45) Date of Patent: Jan. 20, 2004

(54) HICCUP-MODE SHORT CIRCUIT PROTECTION CIRCUIT AND METHOD FOR LINEAR VOLTAGE REGULATORS

(75) Inventor: Joseph C. Buxton, Palo Alto, CA (US)

(73) Assignee: Analog Devices, Inc., Norwood, MA (US)

( * ) Notice: Subject to any disclaimer, the term of this patent is extended or adjusted under 35 U.S.C. 154(b) by 349 days.

(21) Appl. No.: 09/882,998

(22) Filed: Jun. 14, 2001

(51) Int. Cl.$^7$ ................................................ H02H 9/08
(52) U.S. Cl. ....................... 361/93.9; 361/93.1; 327/309
(58) Field of Search ............................ 361/93.1, 93.9, 361/98, 18; 327/309, 108; 323/265, 282, 273, 276

(56) References Cited

U.S. PATENT DOCUMENTS 6,347,029 B1 * 2/2002 Ouyang et al. ............ 361/93.9

OTHER PUBLICATIONS

Unitrode Corporation, *8–Pin N–FET Linear Regulator Controller*, UCC1837, UCC2837, UCC3837, p. 1–7, (Aug. 1999).

Analog Devices, Inc., *Precision Dual Voltage Regulator Controller* ADM1050, p. 1–8, (1999).

* cited by examiner

Primary Examiner—Brian Sircus
Assistant Examiner—Isabel Rodriguez
(74) Attorney, Agent, or Firm—Koppel, Jacobs, Patrick & Heybl

(57) ABSTRACT

A hiccup-mode short circuit protection circuit and method for a linear voltage regulator using a FET pass transistor uses the capacitance of the pass transistor's gate as a timing element. The regulator's output voltage is monitored, and when it droops below a voltage indicative of a short-circuit condition, the regulator's drive signal is disconnected from the pass transistor. While the short-circuit condition persists, a first current is provided to charge the pass transistor's gate capacitance. When the gate voltage rises above a first predetermined threshold, a second current is provided to further charge the gate capacitance. When the gate voltage rises above a second predetermined threshold, the gate capacitance is discharged. The gate capacitance is cyclically charged and discharged in this way unless the output voltage rises to indicate that the short-circuit condition has cleared, in which case the regulator's drive signal is restored to the pass transistor's gate. To reduce average power consumption, the magnitudes of the first and second currents and the values of the threshold voltages are chosen such that the pass transistor's ON duty cycle is about 10%.

21 Claims, 3 Drawing Sheets

HICCUP-MODE SHORT CIRCUIT PROTECTION CIRCUIT AND METHOD FOR LINEAR VOLTAGE REGULATORS

BACKGROUND OF THE INVENTION

1. Field of the Invention

This invention relates to the field of linear voltage regulators, and particularly to short-circuit protection circuits and methods for such regulators.

2. Description of the Related Art

A linear voltage regulator includes an error amplifier and a "pass" transistor. The error amplifier inputs a setpoint voltage and a feedback signal representing the regulator's output voltage, and outputs a drive signal which varies with the error between its inputs. The pass transistor's gate (assuming the pass transistor is a field-effect transistor (FET)) is connected to receive the drive signal, and its drain-source circuit is connected between an input voltage and the regulator's output voltage terminal. The error amplifier's drive signal causes the pass transistor to conduct a current to the output voltage terminal which maintains the output voltage at a desired level.

One problem which may afflict a linear voltage regulator is a short-circuit between the output voltage terminal and ground. When this occurs, the output voltage droops, and the error amplifier responds by increasing the drive signal. This results in the pass transistor carrying a high current, which may damage or destroy the transistor.

To prevent damage to the pass transistor, many linear regulators employ some form of short-circuit protection. Many protection methods require the use of an external sensing element such as a resistor to detect a short. However, this approach increases the regulator's cost, complexity, and power dissipation, and requires an extra pin on the integrated circuit (IC) containing the regulator circuitry.

One method which avoids the need for an external resistor is referred to as "hiccup mode" short-circuit protection, which operates as follows: once a short-circuit condition is detected, closed-loop operation of the regulator is suspended. The pass transistor is turned on briefly, and the output voltage measured. If the output voltage is below a predetermined threshold voltage, indicating that the short-circuit persists, the pass transistor is turned off. After a longer period the pass transistor is turned on again, and the output voltage again measured and compared with the threshold voltage. This pattern is repeated indefinitely, unless the short-circuit clears and the output voltage recovers.

The ratio of the pass transistor's on-time to off-time while the regulator is in hiccup mode is typically controlled by some sort of timing circuit. One approach is illustrated in the ADM1050 voltage regulator controller from Analog Devices, Inc., which employs an internal digital timer and oscillator to handle hiccup mode timing. However, this approach can be silicon intensive, particularly when the integrated circuit (IC) is fabricated using analog processes which are not optimized for digital circuitry. Another implementation is used in the UCC3837 linear regulator controller from Unitrode Corp., which requires the use of an external timing capacitor to provide the necessary timing. However, the external capacitor introduces an extra cost, as well as requiring a dedicated IC package pin.

SUMMARY OF THE INVENTION

A hiccup-mode short circuit protection circuit and method suitable for use with a linear voltage regulator which employs a FET pass transistor is presented. The invention avoids the problems discussed above, requiring neither an internal timer nor an extra pin for a timing capacitor.

The invention uses the capacitance of the FET pass transistor's gate as a hiccup-mode timing element. The regulator's output voltage is monitored, and when it droops below a first predetermined threshold indicative of a short-circuit condition, the amplifier's drive signal is essentially disconnected from the pass transistor. While the short-circuit condition persists, a first current is provided to charge the pass transistor's gate capacitance. When the gate voltage rises above a second predetermined threshold, a second current is provided to further charge the gate capacitance. When the gate voltage rises above a third predetermined threshold, the gate capacitance is discharged. The gate capacitance is cyclically charged and discharged in this way indefinitely, unless the output voltage rises enough to indicate that the short-circuit condition has cleared—in which case the amplifier's drive signal is reconnected to the pass transistor's gate and normal operation resumed.

In a preferred embodiment, a first current source charges the gate capacitance slowly until the pass transistor's turn-on voltage is reached, at which point a second, larger current source is connected to quickly ramp up the gate voltage. To reduce average power consumption, the magnitudes of the first and second currents and the values of the second and third predetermined threshold voltages are chosen such that the ON duty cycle for the pass transistor is about 10%.

Further features and advantages of the invention will be apparent to those skilled in the art from the following detailed description, taken together with the accompanying drawings.

DETAILED DESCRIPTION OF THE INVENTION

Figure 1:
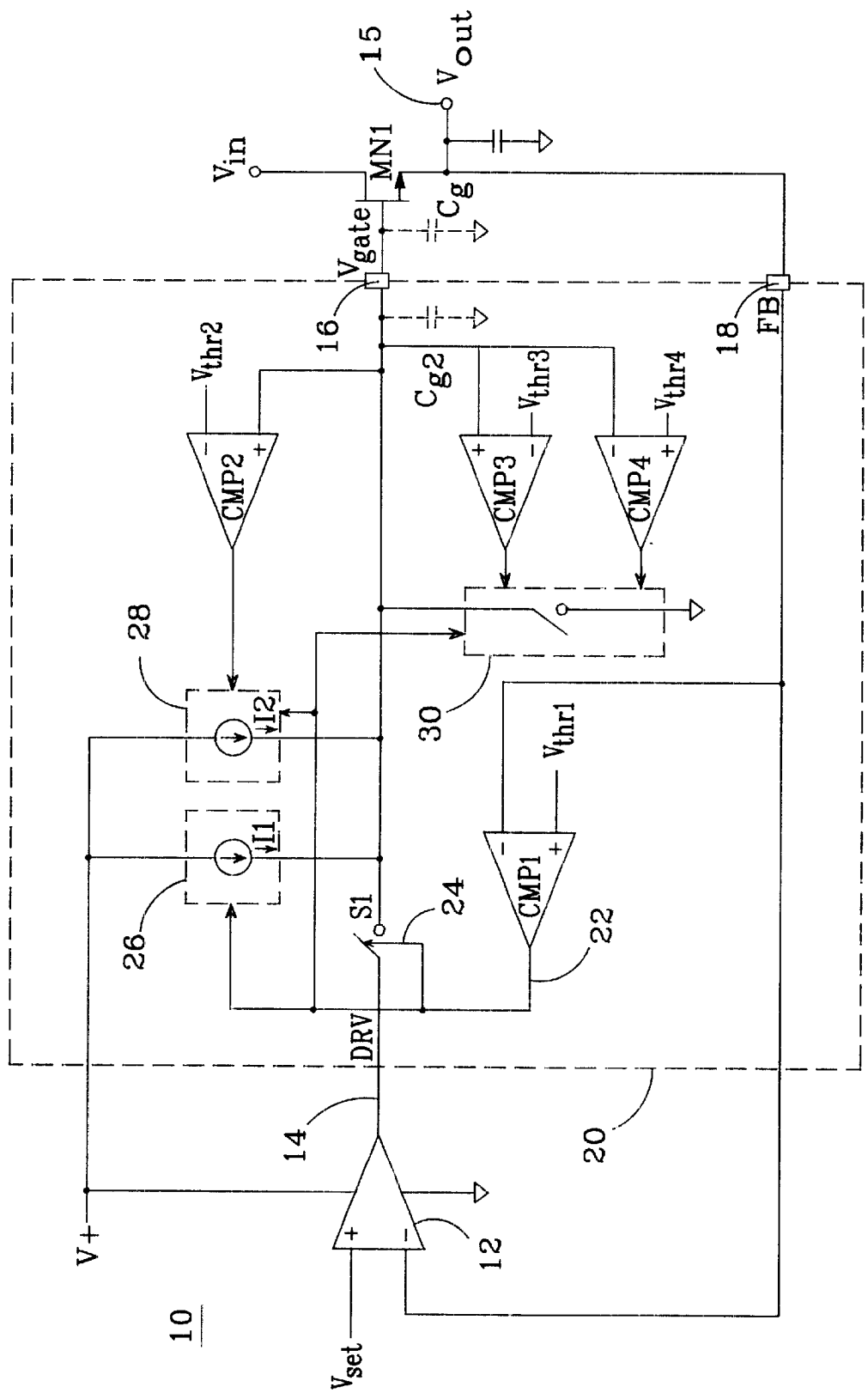
FIG. 1 is a schematic diagram illustrating the basic principles of the present invention.

The basic principles of a hiccup-mode short circuit protection circuit suitable for use with a linear voltage regulator which employs a FET pass transistor are illustrated in FIG. 1. A typical linear voltage regulator 10 consists of an error amplifier 12 which produces a drive signal DRV at an output 14. During normal operation, the drive signal is connected to the gate of a FET pass transistor MN1, the drain-source circuit of which is connected between an input voltage $V_{in}$ and an output voltage terminal 15; MN1 conducts a current which varies with DRV to output voltage terminal 15, thereby producing the regulator's output voltage $V_{out}$. Amplifier 12 receives two inputs: a voltage $V_{set}$ which represents a desired output voltage, and a feedback signal FB representing the $V_{out}$ voltage. Drive signal DRV varies with the error between these inputs, and acts to drive MN1 as necessary to eliminate the error and achieve the desired output voltage.

FET pass transistor MN1 may be integrated with amplifier 12, or be external to the IC containing the regulator circuitry. When pass transistor MN1 is external, amplifier 12 provides drive signal DRV to MN1 via a drive terminal 16, and the feedback signal is received via a feedback terminal 18.

Output voltage $V_{out}$ will droop if it becomes shorted to ground for some reason, and error amplifier 12 will attempt to compensate by driving MN1 to conduct more current. This process can result in MN1 being damaged or destroyed. To prevent this from happening, a hiccup-mode short-circuit protection circuit 20 is used. Hiccup-mode protection requires that, once a short-circuit condition is detected, normal closed-loop operation is suspended and the voltage on the pass transistor's gate periodically ramps up and down to turn MN1 on and off. Output voltage $V_{out}$ is continuously monitored, and if at any time $V_{out}$ exceeds a voltage which indicates that the short-circuit condition has cleared, hiccup-mode is terminated and normal closed-loop operation restored.

The invention implements hiccup-mode protection in a novel and extremely efficient manner. A first comparator CMP1 receives $V_{out}$ (or a signal representing $V_{out}$) at one input, and a threshold voltage $V_{thr1}$ at its second input. The output 22 of CMP1 toggles high when $V_{out}$ falls below $V_{thr1}$, which is chosen to indicate the occurrence of a short-circuit condition. A switch S1 is actuated and de-actuated in response to a control signal 24. S1 is connected such that when actuated, the DRV signal provided by amplifier 12 to MN1 is reduced to zero or near zero; when de-actuated, the DRV signal is restored to MN1. CMP1 output 22 provides control signal 24: when $V_{out}$ falls below $V_{thr1}$, CMP1 toggles high and actuates S1, thereby essentially disconnecting amplifier 12 from MN1 and terminating closed-loop operation of the regulator. This action initiates hiccup-mode operation, which the protection circuit remains in as long as $V_{out}$ remains below $V_{thr1}$.

While in hiccup-mode, a first current source circuit 26 is activated to provide a fixed current I1 to the gate of MN1. As with all FETs, MN1 has an inherent gate capacitance $C_g$, which is charged by current I1. A second comparator CMP2 monitors the voltage $V_{gate}$ on the gate of MN1, which ramps up as the gate capacitance is charged. CMP2 receives $V_{gate}$ at one input, a threshold voltage $V_{thr2}$ at its second input, and produces an output which toggles high when $V_{gate}$ rises above $V_{thr2}$. When the output of CMP2 goes high, a second current source circuit 28 is activated to provide a fixed current I2 to the gate of MN1, further charging the gate capacitance and increasing the ramp rate for $V_{gate}$.

Third and fourth comparators CMP3 and CMP4 also monitor $V_{gate}$, with each comparator receiving $V_{gate}$ at one input and threshold voltages $V_{thr3}$ and $V_{thr4}$ at their respective second inputs. CMP3 produces an output which toggles high when $V_{gate}$ rises above $V_{thr3}$, and CMP4 produces an output which toggles high when $V_{gate}$ falls below $V_{thr4}$. A switch circuit 30 is connected to discharge gate capacitance $C_g$ when the output of CMP3 goes high, and to stop discharging $C_g$ when the output of CMP4 goes high.

Figure 2:
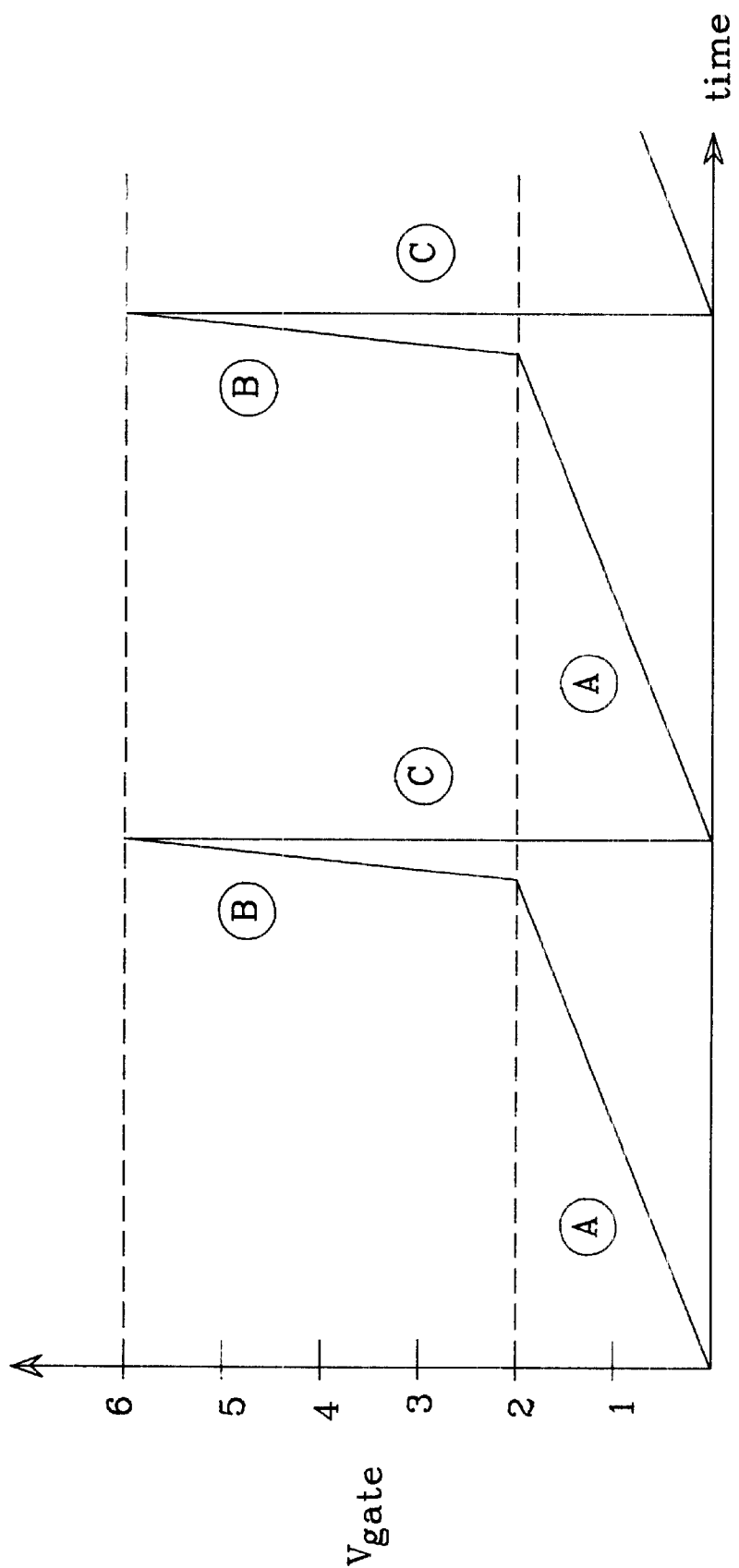
FIG. 2 depicts the pass transistor drive signal waveform provided by the invention during a short-circuit condition.

In operation, when CMP1 detects that $V_{out}$ has drooped below $V_{thr1}$, its output actuates S1 and essentially disconnects amplifier output 14 from MN1, thereby entering hiccup-mode. The waveform of $V_{gate}$ during hiccup-mode is shown in FIG. 2; for the exemplary waveform shown, $V_{thr2}$ is 2 volts, $V_{thr3}$ is 6 volts, and $V_{thr4}$ is 0.2 volts. As hiccup-mode is initiated, current I1 begins to charge $C_g$, causing $V_{gate}$ to ramp up (region A) at a rate that depends on the values of I1 and $C_g$. When $V_{gate}$ increases above $V_{thr2}$ (2 volts), CMP2 activates current source circuit 28, and current I2 further charges $C_g$ (region B), at a rate determined by I1, I2 and $C_g$. $V_{gate}$ is allowed to increase up to $V_{thr3}$ (6 volts), at which point the output of CMP3 actuates switch circuit 30 to discharge the capacitance (region C). CMP4 detects when the gate voltage drops below $V_{thr4}$ (0.2 volts), and de-actuates switch circuit 30. At this point, current I1 begins charging $C_{gate}$ again, and the cycle described above is repeated. If $V_{out}$ rises above $V_{thr1}$ at any time (indicating that the short-circuit condition has cleared), hiccup-mode is terminated: CMP1 de-actuates S1 such that amplifier output 14 is restored to MN1, I2 and switch circuit 30 are disabled, and normal regulator operation is resumed.

The value of $C_g$, in combination with the values of I1 and I2, sets the period of each hiccup-mode cycle. In this way, the regulator's pass transistor is used for two purposes: as the regulator's pass device, and as the timing element for the regulator's hiccup-mode short circuit protection. This novel approach eliminates the need for an internal timing circuit, an external timing capacitor, or an extra IC pin as are required by various prior art hiccup-mode circuits. Note, however, that an external timing capacitor could be connected in parallel with $C_g$ (e.g., $C_{g2}$ in FIG. 1), if it is desired to slow down the ramp rate of $V_g$.

When MN1 is turned on as $V_{gate}$ ramps up, it conducts a high current and dissipates a considerable amount of power. If on too long, MN1 can overheat and become damaged. To avoid this, the present invention is preferably arranged to keep the average power dissipation in MN1 during hiccup-mode small. This is accomplished by having MN1 turned on for only a small portion of each hiccup-mode cycle: preferably about 10% of the total duty cycle. This can be done by selecting $V_{thr2}$ to be in the range of MN1's turn-on voltage (i.e., within about ±0.5 volts of the turn-on voltage), making I1 a small current, and making I2 much larger than I1. The $V_{thr2}$ and I1 values produce the slow ramp portion (region A) of the $V_{gate}$ waveform, during most or all of which MN1 is off. The higher I2 value produces the fast ramp portion (region B) of the $V_{gate}$ waveform, during which MN1 is turned on, voltage $V_{thr3}$ is quickly reached, and MN1 is turned off again. With MN1 on for only a brief portion of each cycle, the desired small ON duty cycle, defined as the percentage of a hiccup-mode cycle period during which MN1 is on, can be achieved.

Use of a single current source to charge $C_g$ would necessarily result in a much higher ON duty cycle, due to the constant rate at which $V_{gate}$ would ramp. For example, if MN1 turns on at 2 volts, and $V_{thr2}$ and $V_{thr3}$ are 2 volts and 6 volts, respectively, MN1 will have an ON duty cycle of 66% if $V_{gate}$ ramps from 0 to 6 volts at a single, constant rate. As a specific example, assume that MN1 carries 5 amps and has a voltage of 3.3 volts across it when on. With an ON duty cycle of 66%, the average power dissipation in MN1 would be (66%×5 amps)×3.3 volts≈11 watts. This amount of power is likely to damage or destroy MN1. However, when two current sources are used as described above to provide an ON duty cycle of 10%, the average power dissipation is only (10%×5 amps)×3.3 volts≈1.65 watts.

With the above considerations in mind, the value of $V_{thr2}$ is preferably chosen (as noted above) to be in the range of the pass transistor's threshold voltage. The value of $V_{thr3}$ needs to be high enough to turn MN1 fully on, but less than the absolute maximum voltage specification for the FET. $V_{thr4}$ should be low enough to indicate that the gate capacitance is substantially discharged. As noted above, $V_{thr1}$ is selected to indicate the presence of a short-circuit condition at the regulator's output terminal.

Referring back to FIG. 1, switch S1 is preferably connected in series between the output 14 of amplifier 12 and the gate of pass transistor MN1. When so configured, S1 is "opened" and disconnects amplifier 12 from MN1 when CMP1 detects that $V_{out}$ has fallen below $V_{thr1}$. S1 is preferably implemented with a FET switch, but other switch types—such as an electro-mechanical relay—could be used as well, as long as the chosen switch substantially reduces the drive signal delivered to MN1 when actuated, and is responsive to a control signal.

It is not essential that S1 be connected as shown in FIG. 1. For example, S1 might be employed within amplifier 12 such that the amplifier is disabled when S1 is actuated. Note that the state of S1 when "actuated" is dependent on how it is used. When configured as shown in FIG. 1, S1 is opened when actuated by CMP1. If used in an alternative manner, however, it may be necessary that S1 close when actuated by CMP1.

It should also be noted that the polarities of the comparator outputs need not be identical to those described above. In addition, the circuits that respond to the comparator outputs may be configured to respond to different logic levels than those described above. For example, though the output of CMP1 is described as toggling from low to high when $V_{out}$ falls below $V_{thr1}$, and that S1 is thereby actuated, CMP1 might also be arranged to toggle from high to low when $V_{out}$ falls below $V_{thr1}$, and S1 can be correspondingly arranged to respond appropriately. This is similarly true for the outputs of CMP2–CMP4 and the operation of current source circuit 28 and switch circuit 30.

Figure 3:
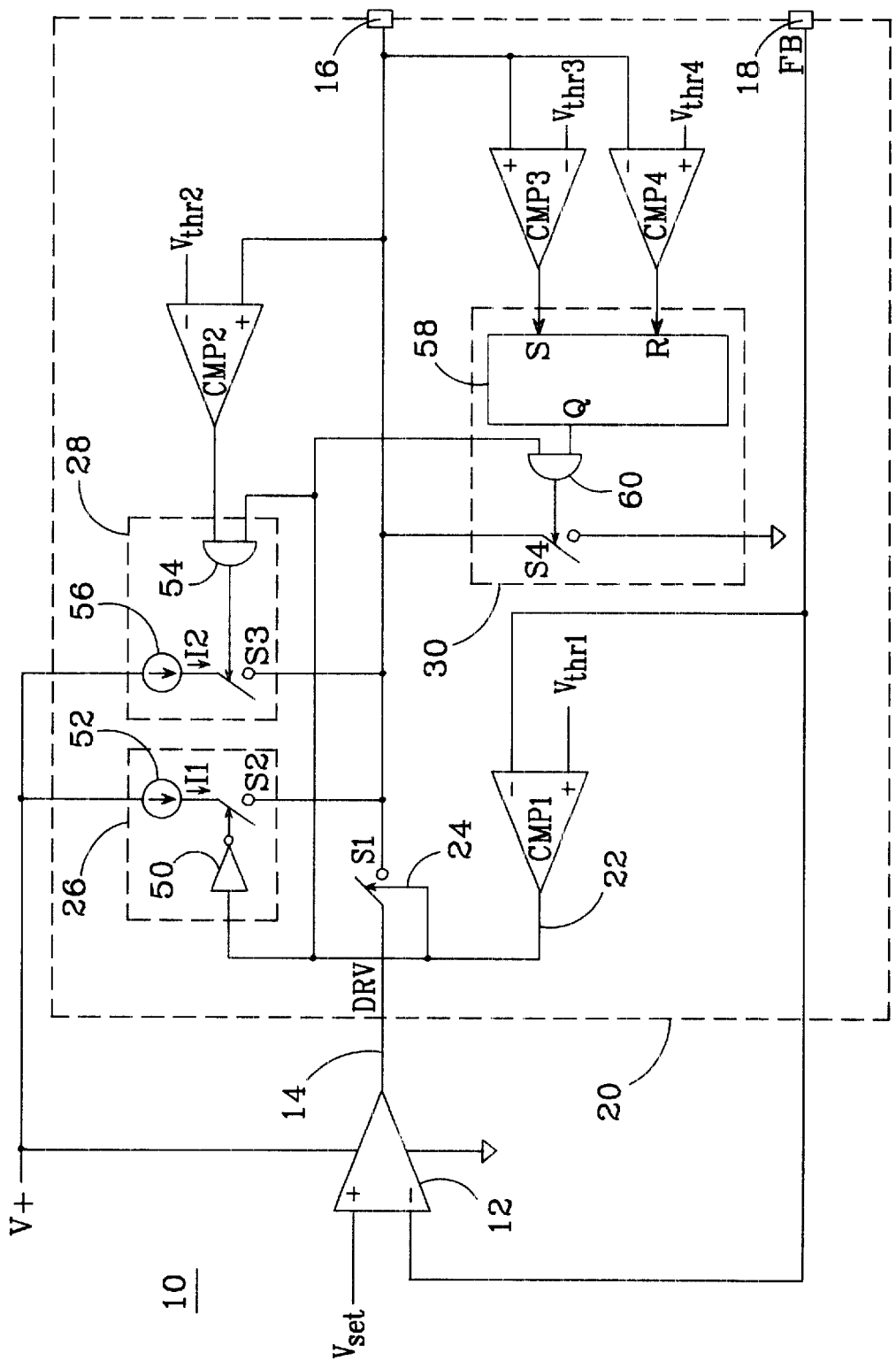
FIG. 3 is a schematic diagram of a preferred embodiment of the present invention.

A preferred embodiment of the present protection circuit 20 is shown in FIG. 3. Elements common to both FIGS. 1 and 3 share the same reference numbers. Here, current source circuit 26 includes an inverter 50, a switch S2 which is controlled by the inverter output, and a fixed current source 52 which produces current I1 connected in series with S2. When the output 22 of CMP1 goes high (indicating a short-circuit condition), S1 is opened, and the output of inverter 50 goes low and closes S2, which allows current I1 to be delivered to drive terminal 16 (and the gate of pass transistor MN1, not shown).

Note that it is not essential that the protection circuit include inverter 50 and switch S2. The output of fixed current source 52 may be connected directly to drive terminal 16 such that I1 is delivered to the pass transistor even during normal operation—as long as the magnitude of I1 is such that it does not inhibit normal closed-loop control of the regulator's output voltage.

Another possibility is to make current I1 switchable, but to do so with circuitry internal to current source 52 which is responsive to the output of CMP1 or inverter 50, rather than with a discrete switch.

Current source 28 preferably comprises an AND gate 54, a switch S3 which is controlled by the AND gate output, and a fixed current source 56 which produces current I2 connected in series with S3. When the output of CMP2 goes high (indicating that $V_{gate}$ has exceeded $V_{thr2}$), and the output of CMP1 is still high (indicating that a short-circuit condition still exists) the output of AND gate 54 goes high and closes S3, which allows current I2 to be delivered to drive terminal 16. Due to the duty cycle and closed-loop operation considerations discussed above, it is essential that I2 be switchable. However, as with current circuit 26, I2 may be made switchable using means other than a discrete switch.

Switch circuit 30 preferably comprises a set-reset (SR) latch 58 which receives the outputs of CMP3 and CMP4 at its set and reset inputs, respectively, an AND gate 60 which receives the output of latch 58 and CMP1, and a switch S4 which is controlled by the AND gate output. S4 is connected between drive terminal 16 and circuit common, such that when actuated, the gate of MN1 is shorted to common and its capacitance discharged. Switch circuit 30 operates as follows: when the output of CMP3 goes high (indicating that $V_{gate}$ has exceeded $V_{thr3}$), the SR latch is set and its output goes high. Since a short-circuit condition still exists, the output of CMP1 is high. These two logic "highs" cause the output of AND gate 60 to go high, which actuates S4 and discharges the gate capacitance. As the capacitance is discharged, $V_{gate}$ starts to fall. When $V_{gate}$ falls below threshold voltage $V_{thr4}$, selected to indicate that $C_g$ is substantially discharged, the output of CMP4 goes high and resets latch 58, causing S4 to be de-actuated and the discharging of $C_g$ to cease.

After $C_g$ is discharged, $V_{gate}$ is below $V_{thr2}$ and $V_{thr3}$. This results in current source 28 being disabled, S4 remaining open, and another hiccup-mode cycle being started. As long as $V_{out}$ remains below $V_{thr1}$, the hiccup-mode cycle will repeat indefinitely. However, if $V_{out}$ exceeds $V_{thr1}$ at any time, the output of CMP1 will go low, disabling the protection circuit and causing the output 14 of amplifier 12 to be restored to the gate of MN1, allowing normal closed-loop regulator operation to resume.

Note that the implementation shown in FIG. 3 is but one possible embodiment of the invention; many other configurations could be conceived to provide a hiccup-mode cycle as described herein.

It should also be noted that, although the pass transistor is shown as an N-type FET in the figures, the invention is equally applicable to use with a P-type FET. In this case, the hiccup-mode short-circuit protection circuit is arranged such that the waveforms of FIG. 2 cycle between 0 volts and a negative $V_{gate}$ voltage.

While particular embodiments of the invention have been shown and described, numerous variations and alternate embodiments will occur to those skilled in the art. Accordingly, it is intended that the invention be limited only in terms of the appended claims.

I claim:

1. A hiccup-mode short circuit protection circuit suitable for use with a linear voltage regulator which employs an N-type field-effect transistor (FET) as a pass transistor, comprising:

a drive signal from a linear voltage regulator's error amplifier suitable for driving the gate of a FET pass transistor connected to said drive signal, said pass transistor arranged to conduct an output current which varies with said drive signal to an output terminal, a first switch circuit arranged to substantially eliminate said drive signal to said pass transistor when the voltage at said output terminal is below a first predetermined threshold voltage indicative of a short-circuit condition, a first current source circuit arranged to charge the gate capacitance of said FET pass transistor while said output terminal voltage is below said predetermined threshold voltage, a second current source circuit arranged to, when the voltage on said gate rises above a second predetermined threshold voltage and said output terminal voltage is below said predetermined threshold voltage, further charge said gate capacitance such that said pass transistor is turned on, and a second switch circuit arranged to, when the voltage on said gate rises above a third predetermined threshold voltage greater than said second predetermined threshold voltage and said output terminal voltage is below said predetermined threshold voltage, discharge said gate capacitance such that said pass transistor is turned off.

2. The protection circuit of claim 1, wherein said FET pass transistor has a known turn-on voltage, said second predetermined threshold voltage is within about ±0.5 volts of said turn-on voltage, said third predetermined threshold voltage is greater than said turn-on voltage and said second predetermined threshold voltage, and said protection circuit is arranged such that, while the voltage at said output terminal is below said first predetermined threshold voltage, said FET pass transistor is cycled on and off with an ON duty cycle of about 10%.

3. A hiccup-mode short circuit protection circuit suitable for use with a linear voltage regulator which employs a P-type field-effect transistor (FET) as a pass transistor, comprising:
 a drive signal from a linear voltage regulator's error amplifier suitable for driving the gate of a FET pass transistor connected to said drive signal, said pass transistor arranged to conduct an output current which varies with said drive signal to an output terminal,
 a first switch circuit arranged to substantially eliminate said drive signal to said pass transistor when the voltage at said output terminal is below a first predetermined threshold voltage indicative of a short-circuit condition,
 a first current source circuit arranged to charge the gate capacitance of said FET pass transistor while said output terminal voltage is below said predetermined threshold voltage,
 a second current source circuit arranged to, when the voltage on said gate falls below a second predetermined threshold voltage and said output terminal voltage is below said predetermined threshold voltage, further charge said gate capacitance such that said pass transistor is turned on, and
 a second switch circuit arranged to, when the voltage on said gate falls below a third predetermined threshold voltage less than said second predetermined threshold voltage and said output terminal voltage is below said predetermined threshold voltage, discharge said gate capacitance such that said pass transistor is turned off.

4. The protection circuit of claim 3, wherein said FET pass transistor has a known turn-on voltage, said second predetermined threshold voltage is within about ±0.5 volts of said turn-on voltage, said third predetermined threshold voltage is less than said turn-on voltage and said second predetermined threshold voltage, and said protection circuit is arranged such that, while the voltage at said output terminal is below said first predetermined threshold voltage, said FET pass transistor is cycled on and off with an ON duty cycle of about 10%.

5. A hiccup-mode short circuit protection circuit suitable for use with a linear voltage regulator which employs a field-effect transistor (FET) as a pass transistor, comprising:
 an amplifier which outputs a drive signal to a drive terminal suitable for driving the gate of a FET pass transistor connected to said drive terminal, said pass transistor arranged to conduct an output current which varies with said drive signal to an output terminal, said amplifier connected to receive a feedback signal representing the voltage at said output terminal and arranged to vary said drive signal to maintain said voltage at a desired level,
 a first switch arranged to substantially eliminate said amplifier's drive signal to said drive terminal when actuated in response to a first control signal,
 a first comparator arranged to output said first control signal such that said first switch is actuated when said output terminal voltage is below a first predetermined threshold voltage indicative of a short-circuit condition between said output terminal and a circuit common point,
 a first current source circuit connected to charge the gate capacitance of said FET pass transistor when said first switch is actuated,
 a second current source circuit arranged to further charge said gate capacitance in response to a second control signal such that said pass transistor is turned on,
 a second comparator arranged to output said second control signal to said second current source such that said second current source circuit further charges said gate capacitance when the voltage at said drive terminal rises above a second predetermined threshold voltage,
 a second switch arranged to discharge the voltage stored on said gate capacitance such that said pass transistor is turned off when actuated in response to a third control signal,
 a third comparator arranged to actuate said second switch such that said gate capacitance is discharged when the voltage at said drive terminal rises above a third predetermined threshold voltage and said first switch is actuated, and
 a fourth comparator arranged to de-actuate said second switch and discontinue discharging said gate capacitance when the voltage at said drive terminal falls below a fourth predetermined threshold voltage which is less than said third predetermined threshold voltage,
 said protection circuit arranged such that said first switch is actuated and said second switch is de-actuated whenever said output terminal voltage is above said first predetermined threshold voltage.

6. The protection circuit of claim 5, wherein said FET pass transistor has a known turn-on voltage, said second predetermined threshold voltage is less than or equal to said turn-on voltage, and said third predetermined threshold voltage is greater than said turn-on voltage.

7. The protection circuit of claim 5, wherein said protection circuit is arranged such that, while said output terminal voltage is below said first predetermined threshold voltage, said FET pass transistor is cycled on and off with an ON duty cycle of about 10%.

8. The protection circuit of claim 5, further comprising a FET pass transistor having its gate connected to said drive terminal and arranged to conduct said output current which varies with said drive signal to said output terminal.

9. The protection circuit of claim 8, further comprising a capacitor connected between the gate and source of said FET pass transistor.

10. A hiccup-mode short circuit protection circuit suitable for use with a linear voltage regulator which employs a field-effect transistor (FET) as a pass transistor, comprising:
 a drive terminal,
 an amplifier which outputs a drive signal to said drive terminal suitable for driving the control input of a pass transistor connected to said drive terminal and which is arranged to conduct an output current that varies with said drive signal to an output terminal, said amplifier connected to receive a feedback signal representing the voltage at said output terminal and arranged to vary said drive signal to maintain said voltage at a desired level,
 a first comparator arranged to toggle its output from a first state to a second state when said output terminal voltage is below a first predetermined threshold voltage indicative of a short-circuit condition between said output terminal and a circuit common point, a first switch connected between said amplifier output and said drive terminal and arranged to open and substantially eliminate said amplifier's drive signal to said drive terminal when said first comparator output is in its second state, a first current source circuit connected to charge said pass transistor's gate capacitance when said first switch is open, a second comparator arranged to toggle its output from a first state to a second state when the voltage at said drive terminal rises above a second predetermined threshold voltage, a second current source circuit connected to, when said second comparator output is in its second state and said first switch is open, further charge said gate capacitance such that said pass transistor is turned on, a third comparator arranged to toggle its output from a first state to a second state when the voltage at said drive terminal rises above a third predetermined threshold voltage which is greater than said second predetermined threshold voltage, a second switch connected between said drive terminal and said circuit common point and arranged to, when said third comparator output is in its second state and said first switch is open, close and discharge said gate capacitance such that said pass transistor is turned off, and a fourth comparator arranged to toggle its output from a first state to a second state when the voltage at said drive terminal falls below a fourth predetermined threshold voltage which is less than said second and third predetermined threshold voltages, said second switch arranged to open and discontinue discharging said capacitance when said fourth comparator output is in its second state, said protection circuit arranged such that said first switch is closed and said second switch is opened whenever said output terminal voltage is above said first predetermined threshold voltage.

11. The protection circuit of claim 10, further comprising a FET pass transistor having its gate connected to said drive terminal and arranged to conduct said output current which varies with said drive signal to said output terminal.

12. The protection circuit of claim 10, further comprising a third switch connected between said second current source and said drive terminal and arranged to close and conduct the output of said second current source to said drive terminal when said second comparator output is in its second state and said first switch is open.

13. The protection circuit of claim 10, further comprising a set-reset latch which is set when the output of said third comparator toggles from its first state to its second state and is reset when the output of said fourth comparator toggles from its first state to its second state, said second switch arranged to close when said latch is set and said first switch is open, and to open when said latch is reset and said first switch is open.

14. The protection circuit of claim 10, wherein said FET pass transistor has a known turn-on voltage, said second predetermined threshold voltage is less than or equal to said turn-on voltage, and said third predetermined threshold voltage is greater than said turn-on voltage.

15. The protection circuit of claim 14, wherein said second predetermined threshold voltage is about 2 volts and said third predetermined threshold voltage is about 6 volts.

16. The protection circuit of claim 14, wherein the output current of said first current source circuit is substantially less than the output current of said second current source circuit such that the rate at which said gate voltage increases while said second current source is off is substantially less than the rate at which said gate voltage increases when said second current source is on.

17. The protection circuit of claim 10, wherein said protection circuit is arranged such that, while said output terminal voltage is below said first predetermined threshold voltage, said FET pass transistor is cycled on and off with an ON duty cycle of about 10%.

18. A method of providing hiccup-mode short-circuit protection for a linear voltage regulator which employs a field-effect transistor (FET) as a pass transistor, comprising:

monitoring the output voltage of a linear voltage regulator which includes a pass transistor and an amplifier which provides a drive signal to the gate of said FET pass transistor to produce said output voltage, detecting when said output voltage is below a first predetermined threshold voltage indicative of a short-circuit condition, suspending the providing of said drive signal to said gate while said short-circuit condition is detected, and cyclically ramping the voltage on said gate up and down while said short-circuit condition is detected, said cycle comprising:

providing a first current to said gate to charge said gate's capacitance, providing, when said gate voltage rises above a second predetermined threshold voltage, a second current to said gate to further charge said capacitance such that said pass transistor is turned on, and discharging, when said gate voltage rises above a third predetermined threshold voltage greater than said second predetermined threshold voltage, said gate capacitance such that said pass transistor is turned off, the period of said cycle dependent upon the values of said first and second currents and said gate capacitance.

19. The method of claim 18, wherein said second and third predetermined threshold voltages and said first and second currents are selected such that the ON duty cycle of said pass transistor while said short-circuit condition is detected is about 10%.

20. The method of claim 18, wherein said second predetermined threshold voltage is less than or equal to the turn-on voltage of said pass transistor.

21. The method of claim 18, further comprising the step of discontinuing the discharging of said gate capacitance when said gate voltage falls below a fourth predetermined threshold voltage.

* * * * *